US006883327B2

United States Patent
Iijima et al.

(10) Patent No.: US 6,883,327 B2
(45) Date of Patent: Apr. 26, 2005

(54) METHOD AND SYSTEM FOR RECOVERING CARBON DIOXIDE

(75) Inventors: Masaki Iijima, Tokyo (JP); Satoru Sugita, Tokyo (JP); Yoshinori Kobayashi, Tokyo (JP); Toshiro Kuroishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/815,756

(22) Filed: Apr. 2, 2004

(65) Prior Publication Data

US 2004/0221578 A1 Nov. 11, 2004

(30) Foreign Application Priority Data

Apr. 30, 2003 (JP) ........................................ 2003-124652

(51) Int. Cl.[7] .............................................. F01K 25/06
(52) U.S. Cl. .............................. 60/649; 60/651; 60/671
(58) Field of Search ............................ 60/649, 651, 671

(56) References Cited

U.S. PATENT DOCUMENTS

| | | | |
|---|---|---|---|
| 4,971,607 A | * 11/1990 | Gazzi et al. | .................. 95/174 |
| 5,344,627 A | 9/1994 | Fujii et al. | |
| 5,405,595 A | 4/1995 | Tomikawa et al. | |
| 5,797,981 A | * 8/1998 | Collin et al. | .................. 95/174 |
| 6,655,150 B1 | 12/2003 | Åsen et al. | |
| 6,782,714 B1 | * 8/2004 | Iijima et al. | .................. 62/611 |

FOREIGN PATENT DOCUMENTS

| | | |
|---|---|---|
| EP | 0 463 663 | 1/1992 |
| EP | 0 551 876 | 7/1993 |
| JP | 03-193116 | 8/1991 |
| WO | 00/48709 | 8/2000 |

\* cited by examiner

Primary Examiner—Hoang Nguyen
(74) Attorney, Agent, or Firm—Wenderoth, Lind & Ponack, L.L.P.

(57) ABSTRACT

To provide a method for recovering carbon dioxide, in which thermal energy for regenerating a $CO_2$ absorbing solution and power for compressing the recovered $CO_2$ are supplied, and high thermal efficiency is achieved, and a system therefor. A system for recovering carbon dioxide including a high pressure turbine 3, an intermediate pressure turbine 7, and a low pressure turbine 8; a boiler 1 for generating steam for driving the turbines; an absorption tower 18 filled with a $CO_2$ absorbing solution for absorbing and removing $CO_2$ from combustion exhaust gas of the boiler; a regeneration tower 24 for regenerating the absorbing solution having absorbed $CO_2$; a compressor 42 for compressing the removed $CO_2$; a turbine 41 for a compressor, which is driven by some of the exhaust steam of the high pressure turbine; turbines 51 and 52 for auxiliary machinery, which are driven by some of the exhaust steam of the intermediate pressure turbine; and supply pipes 45 and 55 for supplying exhaust steam of the compressor turbine and the auxiliary machinery turbines to a reboiler 30 of the regeneration tower as a heating source.

4 Claims, 1 Drawing Sheet

US 6,883,327 B2

METHOD AND SYSTEM FOR RECOVERING CARBON DIOXIDE

BACKGROUND OF THE INVENTION

The present invention relates to a method for recovering carbon dioxide, in which in a thermal electric power plant, carbon dioxide contained in combustion exhaust gas of boiler is removed and recovered, and a system therefor.

In power generating equipment in a thermal electric power plant using large quantities of fossil fuel, as a method for removing and recovering carbon dioxide ($CO_2$), which is one cause for global warming, an amine absorption process has been used (for example, see Japanese Patent Provisional Publication No. 8-257355). However, the amine absorption process has a problem of requiring thermal energy from a large amount of low-pressure steam (for example, about 0.3 MPa) to regenerate an absorbing solution having absorbed $CO_2$. On the other hand, there have been developed a technique for fixing recovered $CO_2$ under pressure in an underground aquifer, a technique for injecting $CO_2$ under pressure into an oil field, a technique for injecting $CO_2$ under pressure into a deep coal seam to recover methane in the coal seam, and other techniques. However, in order to inject $CO_2$ under pressure, it is necessary to compress $CO_2$ to a high pressure (for example, about 140 $kg/cm^2G$), and when a power source for such compression is secured, the output of power plant inevitably decreases significantly.

SUMMARY OF THE INVENTION

The present invention has been made to solve the above problems, and accordingly an object thereof is to provide a method for recovering carbon dioxide, in which thermal energy for regenerating a carbon dioxide absorbing solution and power for compressing the recovered carbon dioxide are supplied, and high thermal efficiency is achieved, and a system therefor.

To achieve the above object, the present invention provides a method for recovering carbon dioxide including the steps of absorbing and removing carbon dioxide by a carbon dioxide absorbing solution from combustion exhaust gas of a boiler for generating steam for driving a high pressure turbine, an intermediate pressure turbine, and a low pressure turbine; compressing the removed carbon dioxide by a compressor; driving a turbine for a compressor by some of exhaust steam of the high pressure turbine; driving a turbine for auxiliary machinery using some of the exhaust steam of the intermediate pressure turbine; and heating and regenerating the carbon dioxide absorbing solution having absorbed carbon dioxide from the exhaust steam of the compressor turbine and the auxiliary machinery turbine.

In this specification, a high pressure turbine means a turbine in which steam discharged from a boiler first performs work. A low pressure turbine means a turbine which performs work finally in the flow of steam, and the exhaust is introduced into a condenser. An intermediate pressure turbine means one or two or more turbines located between the high pressure turbine and the low pressure turbine, and includes, for example, a turbine which is driven by exhaust steam of the high pressure turbine, which is reheated by a reheater. Also, the auxiliary machinery means a pump for sending under pressure condensed water condensed by a condenser, carbon dioxide absorbing solution, etc., a blower for blowing combustion exhaust gas of boiler, and the like.

The method for recovering carbon dioxide in accordance with the present invention can further include a step of injecting the compressed carbon dioxide into an oil field, coal seam, or aquifer under pressure.

Also, the present invention provides, as another aspect, a system for recovering carbon dioxide including a high pressure turbine, an intermediate pressure turbine, and a low pressure turbine; a boiler for generating steam for driving the turbines; a carbon dioxide absorption tower filled with a carbon dioxide absorbing solution for absorbing and removing carbon dioxide from combustion exhaust gas of the boiler; a regeneration tower for regenerating the carbon dioxide absorbing solution having absorbed carbon dioxide; a compressor for compressing the removed carbon dioxide; a compressor turbine, which is driven by some of the exhaust steam of the high pressure turbine; an auxiliary machinery turbine, which is driven by some of the exhaust steam of the intermediate pressure turbine; and a supply pipe for supplying exhaust steam of the compressor turbine and the auxiliary machinery turbine to a reboiler of the regeneration tower as a heating source.

The system for recovering carbon dioxide in accordance with the present invention can further include a discharge pipe for injecting the compressed carbon dioxide into an oil field, coal seam, or aquifer under pressure.

As described above, according to the present invention, there can be provided a method for recovering carbon dioxide, in which thermal energy for regenerating a carbon dioxide absorbing solution and power for compressing the recovered carbon dioxide are supplied, and high thermal efficiency is achieved, and a system therefor.

BRIEF DESCRIPTION OF THE DRAWINGS

Embodiments of the present invention will be described hereinbelow with reference to the accompanying drawings in which.

DETAILED DESCRIPTION OF THE PREFERRED EMBODIMENTS

Figure 1:
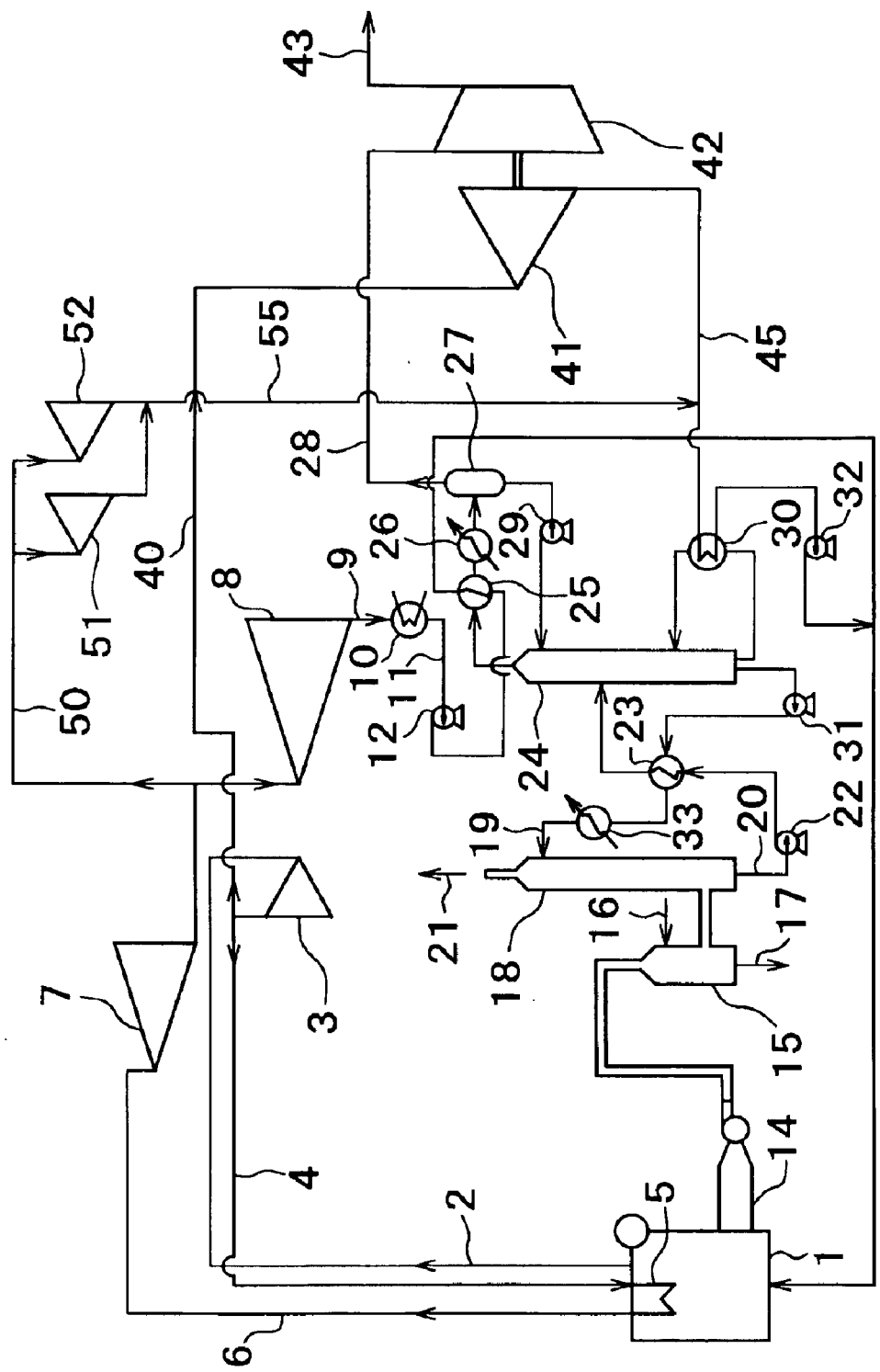
FIG. 1 is a schematic view showing one embodiment of a system for recovering carbon dioxide in accordance with the present invention.

In FIG. 1, only principal equipment is shown, and auxiliary equipment is omitted. If necessary, tanks, valves, pumps, heat exchangers, and the like are additionally provided. Although low pressure, intermediate pressure, and high pressure turbines are usually provided in pairs, these turbines are represented by a single symbol, and a generator attached to these turbines is also omitted.

As shown in FIG. 1, the system for recovering carbon dioxide ($CO_2$) in accordance with the present invention includes a boiler 1 having a reheater 5, a high pressure turbine driven by steam of the boiler 1, an intermediate pressure turbine 7 driven by exhaust steam of the high pressure turbine 3, which is heated by the reheater 5, and a low pressure turbine 8 driven by exhaust steam of the intermediate pressure turbine 7. The exhaust side of the low pressure turbine 8 is connected to the boiler 1 via a condenser 10 for condensing exhaust gas and an overhead condenser 25 for carrying out heat exchange by condensed water and recovered $CO_2$.

On the side of combustion exhaust gas outlet of the boiler 1, a blower 14 for increasing the pressure of combustion exhaust gas, a cooler 15 for cooling the combustion exhaust gas, and a $CO_2$ absorption tower 18 filled with a $CO_2$ absorbing solution for absorbing and removing $CO_2$ from the combustion exhaust gas are provided in that order from the boiler side. As the $CO_2$ absorbing solution, alkanolamine such as monoethanolamine, diethanolamine, triethanolamine, methyldiethanolamine, di-isopropanolamine, and diglycolamine are favorable, and an aqueous solution of any one of these amines or an aqueous solution obtained by mixing two or more of these amines can be used.

The $CO_2$ absorption tower 18 is additionally provided with a regeneration tower 24 for regenerating the absorbing solution having absorbed $CO_2$, and these towers are connected by a line 20 for supplying the absorbing solution having absorbed $CO_2$ to the regeneration tower 24 and a line 19 for supplying regenerated absorbing solution to the $CO_2$ absorption tower 18. The line 20 and the line 19 are provided with a rich/lean solvent heat exchanger 23 for carrying out heat exchange between these lines. Also, between the $CO_2$ absorption tower 18 and the heat exchanger 23 on the line 19, a lean solvent cooler 33 is provided to further cool the regenerated absorbing solution. The regeneration tower 24 is additionally provided, at the lower part thereof, with a reboiler 30 for heating the absorbing solution having absorbed $CO_2$.

On the other hand, on the side of a $CO_2$ outlet provided on the top of the regeneration tower 24, the overhead condenser 25 for carrying out heat exchange by means of $CO_2$ and condensed water, an overhead cooler 26 for cooling $CO_2$, a separator 27 for separating water from $CO_2$, and a compressor 42 for compressing the separated $CO_2$ are provided in that order from the regeneration tower side. The compressor 42 is further provided with a line 43 for supplying the compressed $CO_2$ to an oil field, coal seam, or aquifer (not shown).

Also, the compressor 42 is additionally provided with a back pressure turbine 41 for a compressor, which serves as a power source for the compressor 42. The compressor back pressure turbine 41 is provided with a line 40 for introducing some of the exhaust steam of the high pressure turbine 3 and a line 45 for supplying the exhaust steam of the compressor back pressure turbine 41 to the reboiler 30.

Furthermore, in this embodiment, there are provided a back pressure turbine 51 for auxiliary machinery, which is used to drive the blower 14, and a back pressure turbine 52 for auxiliary machinery, which is used to drive a pump 12 for increasing the pressure of condensed water. These auxiliary machinery back pressure turbines 51 and 52 are provided with a line 50 for introducing some of the exhaust steam of the intermediate pressure turbine 7 and a line 55 for supplying the exhaust steam of the back pressure turbines 51 and 52 for auxiliary machinery to the reboiler 30.

Such auxiliary machinery back pressure turbines that are driven by some of the exhaust steam of the intermediate pressure turbine 7 to supply the exhaust steam to the reboiler 30 are not limited to the above-described two back pressure turbines for the blower 14 and the pump 12. Three or more auxiliary machinery back pressure turbines can be provided by adding a back pressure turbine for a rich solvent pump 20 for increasing the pressure of the absorbing solution having absorbed $CO_2$, one for a lean solvent pump 31 for increasing the pressure of the regenerated absorbing solution, one for a reboiler condensate pump 32 for increasing the pressure of condensate condensed by the reboiler 30, and the like, or inversely only one back pressure turbine for auxiliary machinery can be provided. In other words, the number of back pressure turbines for auxiliary machinery can be increased or decreased according to the thermal energy required by the reboiler 30.

According to such a configuration, the boiler combustion exhaust gas containing $CO_2$, which is discharged from the boiler 1, is sent to the cooler 15 after the pressure thereof is increased by the blower 14, and is cooled by cooling water 16. The cooled combustion exhaust gas is sent to the $CO_2$ absorption tower 18, and cooling water drain 17 is discharged to the outside of the system.

In the $CO_2$ absorption tower 18, the combustion exhaust gas comes into contact with the $CO_2$ absorbing solution whose base is alkanolamine, and $CO_2$ in the combustion exhaust gas is absorbed in the $CO_2$ absorbing solution by chemical reaction. Combustion exhaust gas 21 from which $CO_2$ is removed is discharged to the outside of system. The pressure of the absorbing solution having absorbed $CO_2$ is increased by a rich solvent pump 22 via the line 20. After being heated by the rich/lean solvent heat exchanger 23, the absorbing solvent is supplied to the regeneration tower 24.

At the lower part of the regeneration tower 24, the absorbing solution having absorbed $CO_2$ is heated by the reboiler 30, and $CO_2$ is separated from the absorbing solution. The separated $CO_2$ is discharged from the top of the regeneration tower 24 while being accompanied by steam, and is introduced into the overhead condenser 25.

$CO_2$ accompanied by steam preheats boiler feedwater in the line 11 in the overhead condenser 25, and is further cooled in the overhead cooler 26, by which condensed water is removed by the separator 27. The $CO_2$ from which water is removed is introduced into the compressor 42 via a line 28, and is compressed to a high pressure (about 140 $kg/cm^2G$). The compressed $CO_2$ is supplied to an oil field or aquifer (not shown) through the line 43. The water separated by the separator 27 is sent to the regeneration tower 24 by a condensed water circulating pump 29.

After the pressure of the absorbing solution regenerated in the regeneration tower 24 is increased by the lean solvent pump 31, the regenerated absorbing solution is cooled by the absorbing solution having absorbed $CO_2$ in the rich/lean solvent heat exchanger 23. Further, the regenerated absorbing solution is cooled by the lean solvent cooler 33, and then is supplied to the $CO_2$ absorption tower 18.

On the other hand, high-pressure high-temperature steam (about 300 $kg/cm^2G$, about 600° C.) generated and heated by the boiler 1 is introduced into the high pressure turbine 3 via a line 2 to drive the high pressure turbine 3. Some of the exhaust steam (about 40 $kg/cm^2G$, about 600° C.) of the high pressure turbine is introduced into the back pressure turbine 41 for compressor via the line 40 to drive the back pressure turbine 41 for compressor. The remainder thereof is heated by the reheater 5 in the boiler 1 via a line 4. The proportion of the exhaust steam sent to the line 40 is set so that the thermal efficiency of the whole process is optimized. Usually, this proportion is in the range of 15 to 20%.

The reheated exhaust steam (about 600° C.) of the high pressure turbine is introduced into the intermediate pressure turbine 7 via a line 6 to drive the intermediate pressure turbine 7. Some of the exhaust steam (about 10 $kg/cm^2G$) of the intermediate pressure turbine is introduced into the back pressure turbines 51 and 52 for auxiliary machinery via the line 50 to drive the back pressure turbines 51 and 52 for auxiliary machinery. The remainder thereof is introduced into the low pressure turbine 8 to drive the low pressure turbine 8. The proportion of the exhaust steam sent to the line 50 is set so that the thermal efficiency of the whole process is optimized. Usually, this proportion is in the range of 5 to 10%.

The exhaust of the low pressure turbine 8 is introduced into the condenser 10 via a line 9, and is condensed by the condenser 10. The condensed water is caused to flow by the boiler feed pump 12, and after being preheated in the overhead condenser 25, it is sent to the boiler 1 as boiler feedwater.

The exhaust steam (about 3 kg/cm$^2$G, about 140° C.) of the back pressure turbine 41 for compressor is supplied to the reboiler 30 via the line 45. Similarly, the exhaust steam (about 3 kg/cm$^2$G, about 250° C.) of the back pressure turbines 51 and 52 for auxiliary machinery is also supplied to the reboiler 30 via the line 55. After being condensed by the reboiler 30, these exhaust steams are pressurized by the reboiler condensate pump 32. By being mixed with boiler feedwater, the exhaust steams increase the temperature of boiler feedwater, and then are sent to the boiler 1.

Thus, since the exhaust steam of the high pressure turbine 3 has a relatively high pressure, some of the exhaust steam of the high pressure turbine 3 drives the back pressure turbine 41 for compressor, by which power necessary for compressing the recovered $CO_2$ to a high pressure can be obtained by a small quantity of steam. Also, the exhaust steam of the back pressure turbine 41 for compressor has a pressure of about 3 kg/cm$^2$G, and also the temperature thereof is about 140° C., which is not that much higher than the regeneration temperature of $CO_2$ absorbing solution of 120° C. Therefore, the exhaust steam of the back pressure turbine 41 for compressor can be used directly as a heating steam source for the reboiler 30. Therefore, there is no need for cooling etc., and the thermal energy can be utilized efficiently.

Also, since the back pressure turbine 41 for compressor uses some of the exhaust steam of the high pressure turbine 3, the quantity of steam necessary for heating the reboiler 30 is not sufficiently supplied by only the exhaust steam of the back pressure turbine 41 for compressor. Therefore, in addition to the exhaust steam of the back pressure turbine 41 for compressor, the exhaust steam of the back pressure turbines 51 and 52 for auxiliary machinery is used as a heating steam source for the reboiler 30. Since the back pressure turbines 51 and 52 for auxiliary machinery use some of the exhaust steam of the intermediate pressure turbine 7, the energy balance can be maintained, and the decrease in power generation efficiency can be restrained.

A method can be thought of in which in place of the exhaust steam of the back pressure turbines 51 and 52 for auxiliary machinery, steam extracted from the low pressure turbine 8 is supplied to the reboiler 30. However, in order to compensate thermal energy required by the reboiler 30, the quantity of extracted steam must be increased. Therefore, it is necessary to redesign the construction of the low pressure turbine itself. On the other hand, according to the present invention, some of the exhaust steam of the low pressure turbine 8 is used without relying on the steam extraction, so that the decrease in power generation efficiency can be restrained, and also the existing turbine can be used. Therefore, equipment costs and other costs can be reduced.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No. 2003-124652 filed on Apr. 30, 2003 including specification, claims, drawings and summary are incorporated herein by reference in its entirety.

What is claimed is:

1. A method for recovering carbon dioxide comprising the steps of:

absorbing and removing carbon dioxide by a carbon dioxide absorbing solution from combustion exhaust gas of a boiler for generating steam for driving a high pressure turbine, an intermediate pressure turbine, and a low pressure turbine;

compressing the removed carbon dioxide by a compressor;

driving a turbine for a compressor by some of exhaust steam of said high pressure turbine;

driving a turbine for auxiliary machinery by some of exhaust steam of said intermediate pressure turbine; and heating and regenerating said carbon dioxide absorbing solution having absorbed carbon dioxide by exhaust steam of said turbine for compressor and said turbine for auxiliary machinery.

2. The method for recovering carbon dioxide according to claim 1, which further comprises a step of injecting said compressed carbon dioxide into an oil field, coal seam, or aquifer under pressure.

3. A system for recovering carbon dioxide comprising:

a high pressure turbine, an intermediate pressure turbine, and a low pressure turbine;

a boiler for generating steam for driving said turbines;

a carbon dioxide absorption tower filled with a carbon dioxide absorbing solution for absorbing and removing carbon dioxide from combustion exhaust gas of said boiler;

a regeneration tower for regenerating said carbon dioxide absorbing solution having absorbed carbon dioxide;

a compressor for compressing the removed carbon dioxide;

a turbine for compressor, which is driven by some of exhaust steam of said high pressure turbine;

a turbine for auxiliary machinery, which is driven by some of exhaust steam of said intermediate pressure turbine; and a supply pipe for supplying exhaust steam of said turbine for compressor and said turbine for auxiliary machinery to a reboiler of said regeneration tower as a heating source.

4. The system for recovering carbon dioxide according to claim 3, which further comprises a discharge pipe for injecting said compressed carbon dioxide into an oil field, coal seam, or aquifer under pressure.

* * * * *